INVENTOR.
MANFRED R. KUEHNLE
BY
Weingarten, Orenbuch & Lahive
ATTORNEYS

INVENTOR.
MANFRED R. KUEHNLE
BY
Weingarten, Orenbuch & Lahive
ATTORNEYS

Feb. 11, 1969 M. R. KUEHNLE 3,427,406

AUTOMATIC TELEPHONE DIALING APPARATUS

Filed Oct. 22, 1965 Sheet 3 of 7

Weingarten, Orenbuch & Lahive
ATTORNEYS

INVENTOR.
MANFRED R. KUEHNLE
BY
Weingarten, Orenbuch, & Lahive
ATTORNEYS

INVENTOR.
MANFRED R. KUEHNLE
BY
Weingarten, Orenbuch & Lahive
ATTORNEYS

Feb. 11, 1969 M. R. KUEHNLE 3,427,406

AUTOMATIC TELEPHONE DIALING APPARATUS

Filed Oct. 22, 1965 Sheet 6 of 7

INVENTOR.
MANFRED R. KUEHNLE
BY
Weingarten, Orenbuch & Lahive
ATTORNEYS

INVENTOR.
MANFRED R. KUEHNLE
BY
Weingarten, Orenbuch, & Lahive
ATTORNEYS

United States Patent Office 3,427,406
Patented Feb. 11, 1969

3,427,406
AUTOMATIC TELEPHONE DIALING APPARATUS

Manfred R. Kuehnle, Lexington, Mass., assignor, by mesne assignments, to DASA Corporation, Andover, Mass., a corporation of Massachusetts Filed Oct. 22, 1965, Ser. No. 500,918
U.S. Cl. 179—90 9 Claims
Int. Cl. H04m 1/46

ABSTRACT OF THE DISCLOSURE

Automatic telephone dialing apparatus including, in a unitary housing, a handset, a pushbutton dialing mechaniusm, a magnetic tape cartridge and associated circuitry. The dialing mechanism is selectively operative for manual dialing and for entry of dailing data onto the magnetic tape and includes means for controlling movement of the tape in accordance with the particular button actuated.

This invention relates to magnetic tape storage systems of the type employing a tape arranged to be transported between a pair of reels. The invention here disclosed is a continuation-in-part and an improvement upon the Data Storage System described in my copending application Ser. No. 360,609, filed Apr. 17, 1964 and the disclosure of that application is here incorporated by reference.

The invention utilizes a tape of the kind capable of retaining magnetic signals and which has a surface upon which information can be printed or written so as to be visible. The tape is in the form of a long ribbon that is wound upon a reel. In the invention, the tape is arranged to be transported to and wound upon another reel, both reels and the tape being contained within a magazine in a manner permitting the direction of tape movement to be reversed. Information is magnetically and visually recorded on the tape in groups, the groups being spaced longitudinally along the tape and each group having a multitude of addresses spaced transversely across the tape. To locate an address, it is necessary to search the tape longitudinally for the appropriate group and to then search the tape transversely for the address in the group. At the address, data is magnetically recorded so that it extends longitudinally along the tape.

The invention resides in a tape driving mechanism by which longitudinal movement of the tape is controlled so that the tape can be readily searched for a desired group and is automatically stopped in a position where the tape is in an indexed position relative to a magnetic transducer employed for reading and writing. The tape driving mechanism, upon operation of a control button, is arranged to cause the tape to move relative to the magnetic transducer at a speed appropriate for reading or writing and to cause the tape to be automatically returned to its longitudinally indexed position after readout of the recorded information.

The invention is here described as utilized in an automatic telephone dialing device; however, it should be understood that the invention resides in a data storage system which can be employed in other devices where visual location of information upon a magnetic tape is useful. The invention, both as to its arrangement and manner of operation, can be more fully understood from the exposition herein when considered together with the accompanying drawings in which.

As mentioned above briefly, for convenience of reference, the data storage system is described and shown in the figures in terms of an automatic telephone dialer system. In the apparatus, telephone numbers are magnetically recorded on one side of the tape while the subscriber's name is shown legibly on the reverse side of the tape. The subscriber's name serves therefore as an indication of the position on the tape of the subscriber's magnetically coded telephone number. The subscribers' names are arranged in groups in alphabetic sequence along the tape and to locate a desired number the tape is scanned longitudinally until the correct alphabetic group is found. A magnetic read-write head is then positioned transversely by means of an indicator button so that it is aligned with the line bearing the telephone number for the particular subscriber within the alphabetic grouping. An operate button is then pushed which causes the read-write head to read out the magnetically coded number, which is amplified through a suitable amplifier and applied to the telephone line as a dialing signal.

Figure 1:
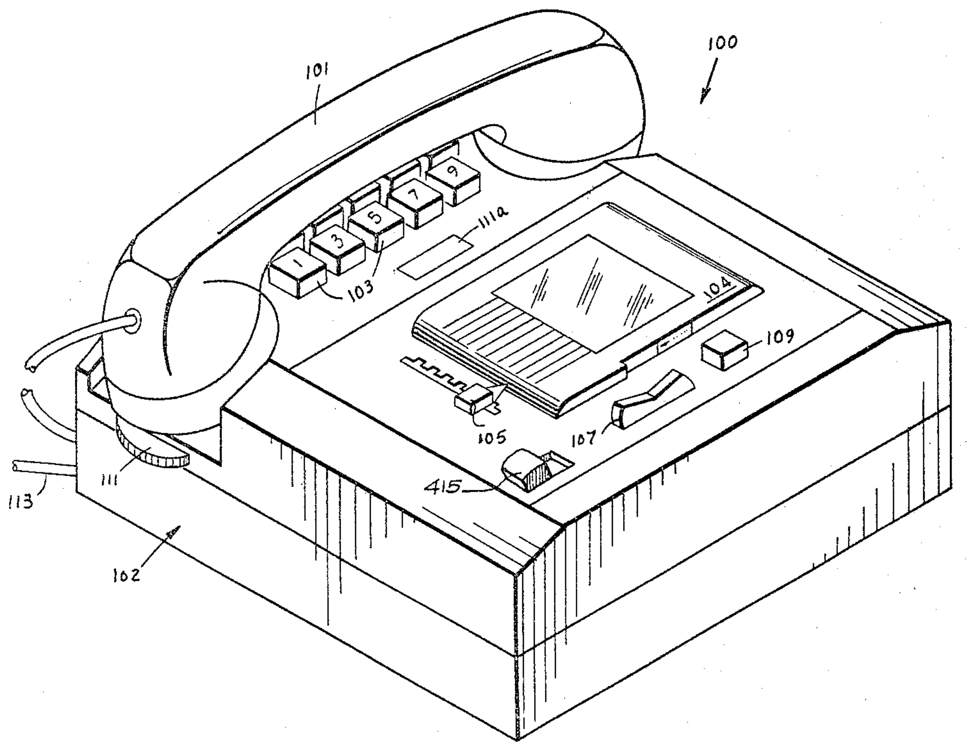
FIG. 1 is a perspective view of a telephone station according to a second embodiment of this invention.

Referring now to FIG. 1, there is shown a complete, but compact, telephone calling and receiving station 100 constructed in accordance with the principles of this invention. The station comprises, generally, a base and cover assembly 102 on which the handset 101 is normally cradled, a dialing mechanism (here simply shown as 10 push buttons 103 underlying the handset 101), a magnetic tape cartridge 104, a track marker 105, a tape position adjuster 107, an operate button 109, a mode selector 111, a mode indicating station 111*a*, and a conventional telephone line 113 for connecting the station with a telephone system.

Figure 3A:
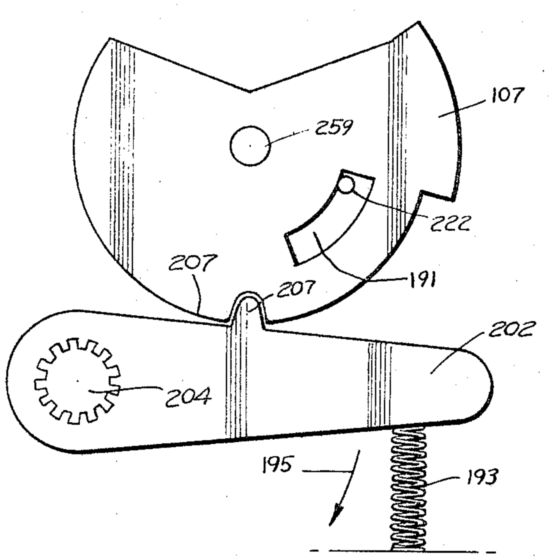
FIG. 3A is a detailed view of the tape position adjusting control knob.
Figure 3:
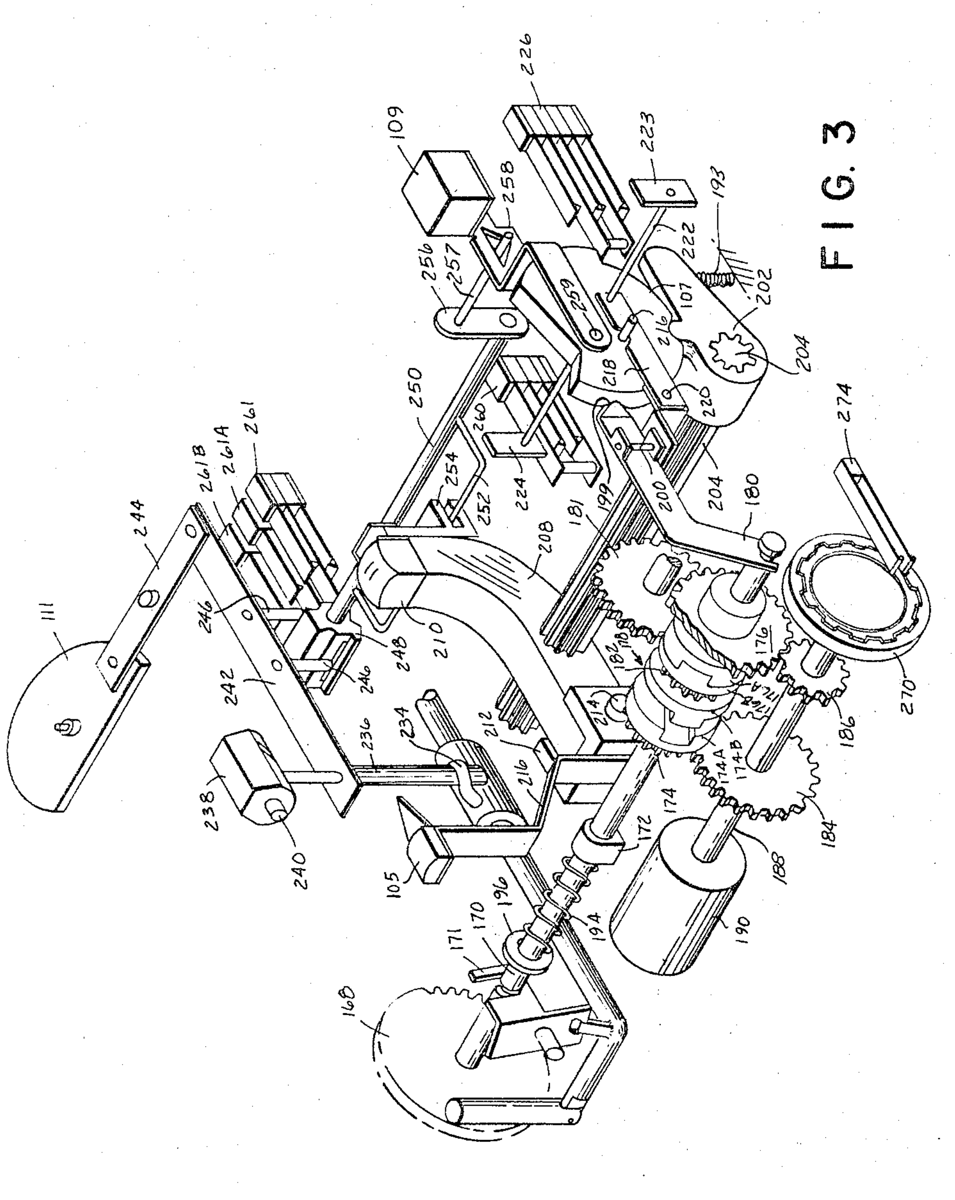
FIG. 3 is an isolated view, somewhat distorted and simplified for purposes of illustration of the control mechanism for selectively positioning and operating the recorder portion of the telephone station of FIG. 2.
Figure 6:
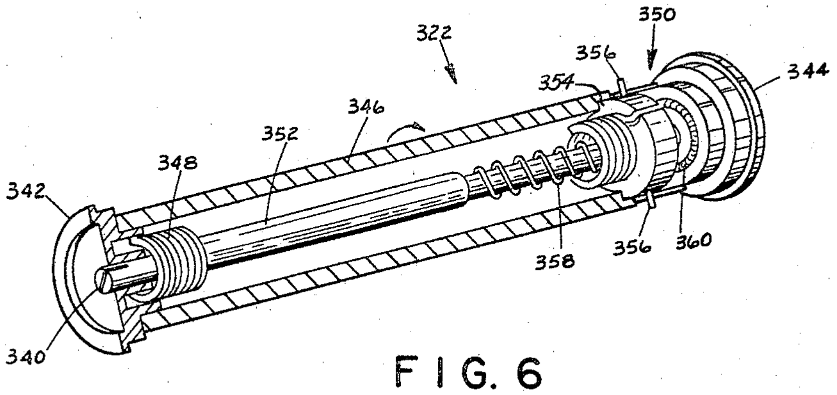
FIG. 6 is a view, partially sectioned, of a takeup spool in the magnetic tape magazine shown in FIG. 5.
Figure 5:
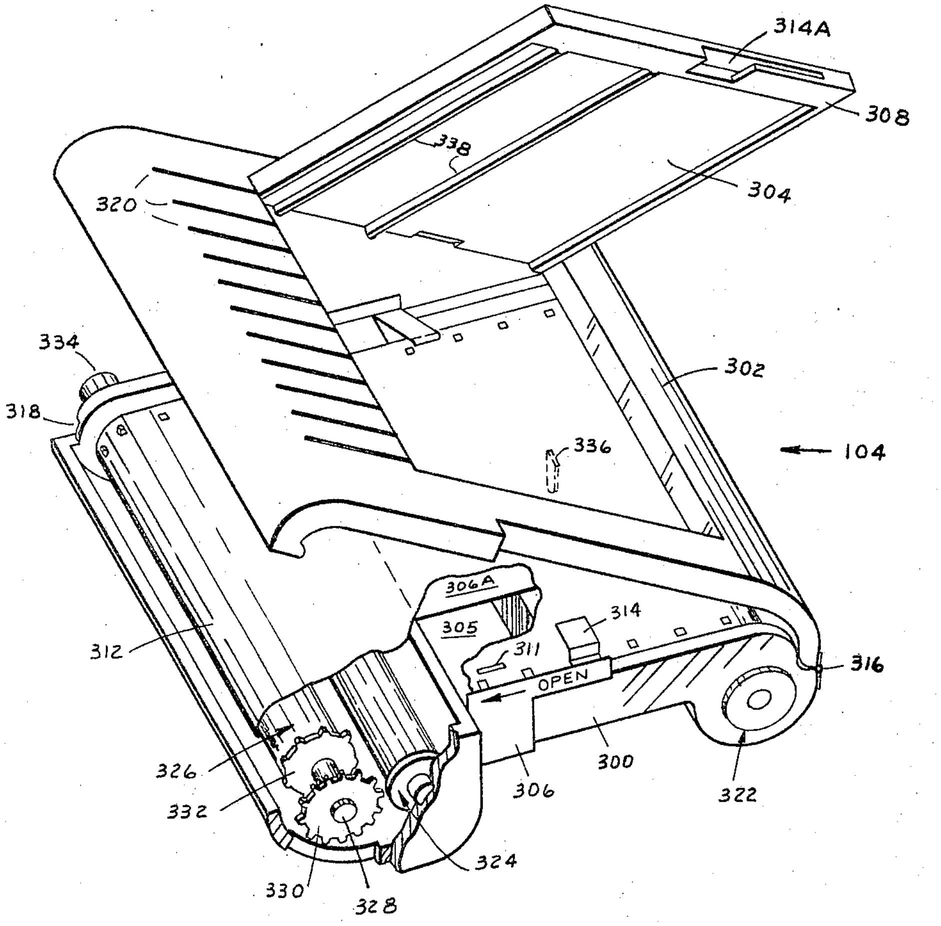
FIG. 5 is a view of a magnetic tape magazine for use in the telephone station shown in FIG. 2.

The data storage tape 312, shown in FIG. 5, has the visual address information arranged in groups of words or names arranged longitudinally along the tape (as is more fully explained in my copending application Ser. No. 360,609). The magnetically recorded data within each group is stored lengthwise of the tape in positions where the magnetically recorded data is indexed in relation to the names or words visible upon the tape. To locate a desired address, the tape is searched by causing it to be transported from one reel to the other until the proper group appears in window 304. The tape 312 is caused to move longitudinally by pressing upon tape position adjuster knob 107 (FIG. 1). The knob 107, as viewed in FIGS. 3 and 3A, can be moved either clockwise or counterclockwise depending upon which portion of the knob is pressed. Where the knob is moved clockwise, the tape 312 moves, in FIG. 5, from left to right whereas when the knob is moved counterclockwise, the tape moves from right to left. To mark when a group on the tape is correctly positioned longitudinally with respect to a reading head 210 (FIG. 3), the tape has a series of registration slots, such as the slot 311 of FIG. 5, spaced longitudinally along one edge of the tape. When the proper group appears in window 304, knob 107 (FIGS. 1, 3 and 3A) is released, whereupon, regardless of the direction in which the tape was previously moving, the tape moves from right to left until slot 311 comes into registration with a pin 224 (FIG. 3) located underneath the tape in the space 305. Upon the pin 224 entering registration slot 311, the tape comes to a stop with the magnetically recorded data appropriately positioned to be read by magnetic transducer 210 (FIG. 3). With the desired group in view in the window 304 (FIG. 5) and the tape stopped, the track marker 105 (FIGS. 1 and 3) is moved to the desired name or word within the group. The track marker moved transversely with respect to tape 312 and in being moved, the track marker carries along with it the magnetic transducer 210 (FIG. 3) which slides along the splined shaft 204 (FIG. 3). Therefore, by indexing the track marker with a name or word in the group, the transducer is positioned in alignment with the magnetically recorded information on the tape relating to that name or word. An indexing bar, such as is shown in FIG. 6 of my copending application Ser. No. 360,609, may be employed in conjunction with the track marker to ensure accurate transverse indexing.

The speed at which the tape is transported during the search phase, can be controlled by the amount of pressure exerted upon knob 107, as taught in my copending application Ser. No. 360,609. Therefore, by adjusting the pressure upon knob 107, the tape can be brought at high speed to the approximate vicinity of the address being sought and thereafter the scan can proceed at a slower speed until the appropriate group appears in the window.

When the handset 101 is cradled, as illustrated in FIG. 1, access to push buttons 103 is rendered difficult. It is evident that the base and cover assembly 102 may be so shaped that the handset 101, when cradled, effectively prevents access to the push button 103, thereby removing any chance that entries may be inadvertently made or changed in the magnetic tape cartridge 104. When the handset 101 is lifted from its cradled position, the station is conditioned for operation. That is, easy access to the buttons 103 is permitted and a conventional hook switch (not here shown) is operated. The mode selector 111 may then be actuated to condition the station for operation as a conventional telephone station, as a recorder of any telephone number, or as a reproducer of any recorded telephone number.

When it is desired to enter a name and telephone number in the magnetic tape cartridge 104, the tape position adjuster 107 and the track marker 105 are actuated to select a particular track at a particular address along the magnetic tape in the magnetic tape cartridge 104. The mode selector 111, as will be described hereinafter, is also actuated to condition the station for recording. It should be noted here that in this mode of operation, any telephone number which is to be recorded is also transmitted over a telephone line 113. That is, when the appropriate ones of the buttons 103 are sequentially actuated to record a train of signals indicative of a desired telephone number, that station having such number is also signalled. The name of the person or place associated with such telephone number is then inscribed on the upper surface of the magnetic tape so that the location of the recorded telephone number is thereafter always readily found.

When a recorded telephone number is to be reproduced, the location of the number is first found by actuating the tape position adjuster 107 and the track marker 105. The handset 101 is then removed from its cradled position on the base and cover assembly 102 and the operate switch

109 is depressed. A sequence of operations then ensues which produces dial pulses corresponding to the recorded telephone number to be produced. In reproducing the telephone number, the magnetically recorded information on the tape is read out by the transducer 210 (FIG. 3). The magnetic readout is accomplished by moving the tape longitudinally over the stationary transducer. Because the search phase and the magnetic readout phase both require the tape to move longitudinally, the same tape motion producing mechanism is employed for search and data readout. However, a precisely controlled uniform tape speed must be used for the readout of the magnetically stored data whereas the search phase preferably employs a variable tape speed. The tape motion producing mechanism is therefore arranged so that the tape speed is uniform during data readout or when information is being magnetically recorded on the tape.

Figure 2:
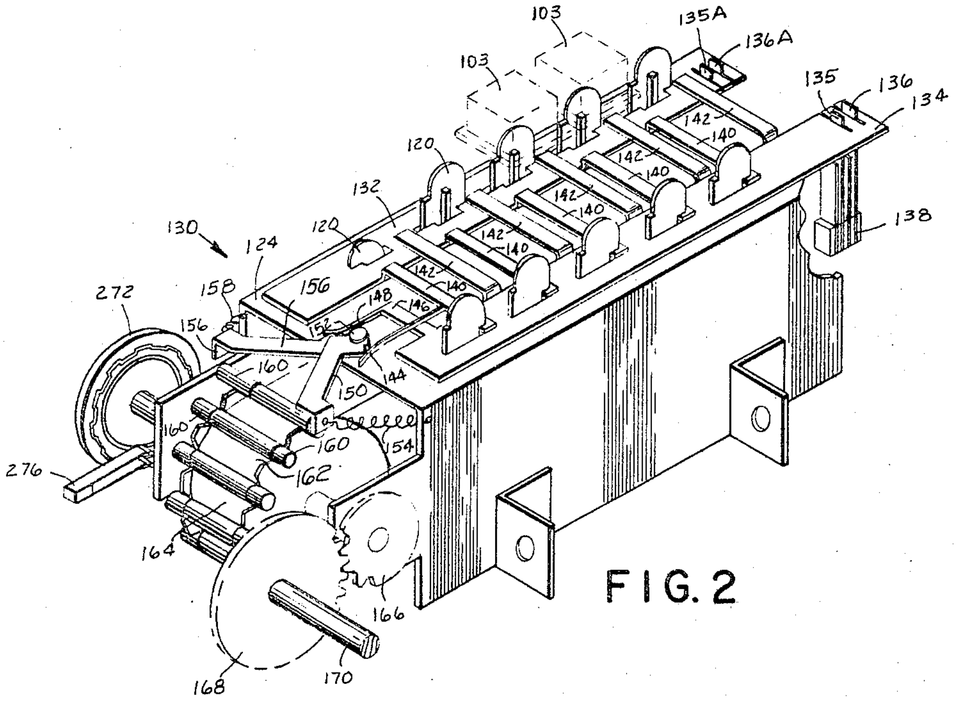
FIG. 2 is a view, partially cut away, of a keyboard for the telephone station of FIG. 1.
Figures 2A, 2B, 2C:
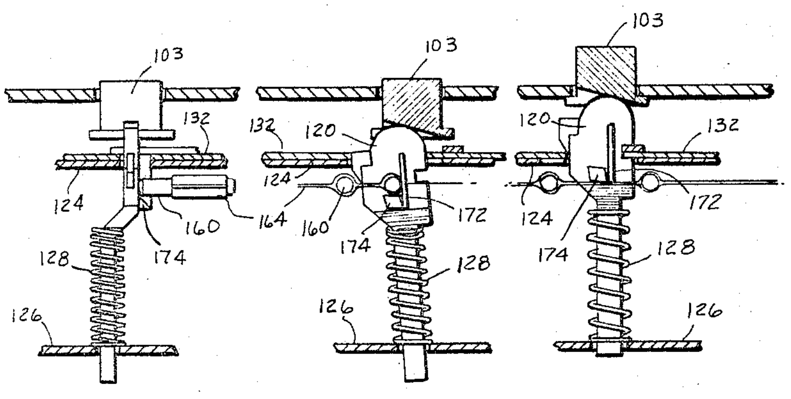
FIGS. 2A, 2B and 2C are views of a single one of the keys shown in FIG. 2 to illustrate the manner in which such key operates.
Figure 7:
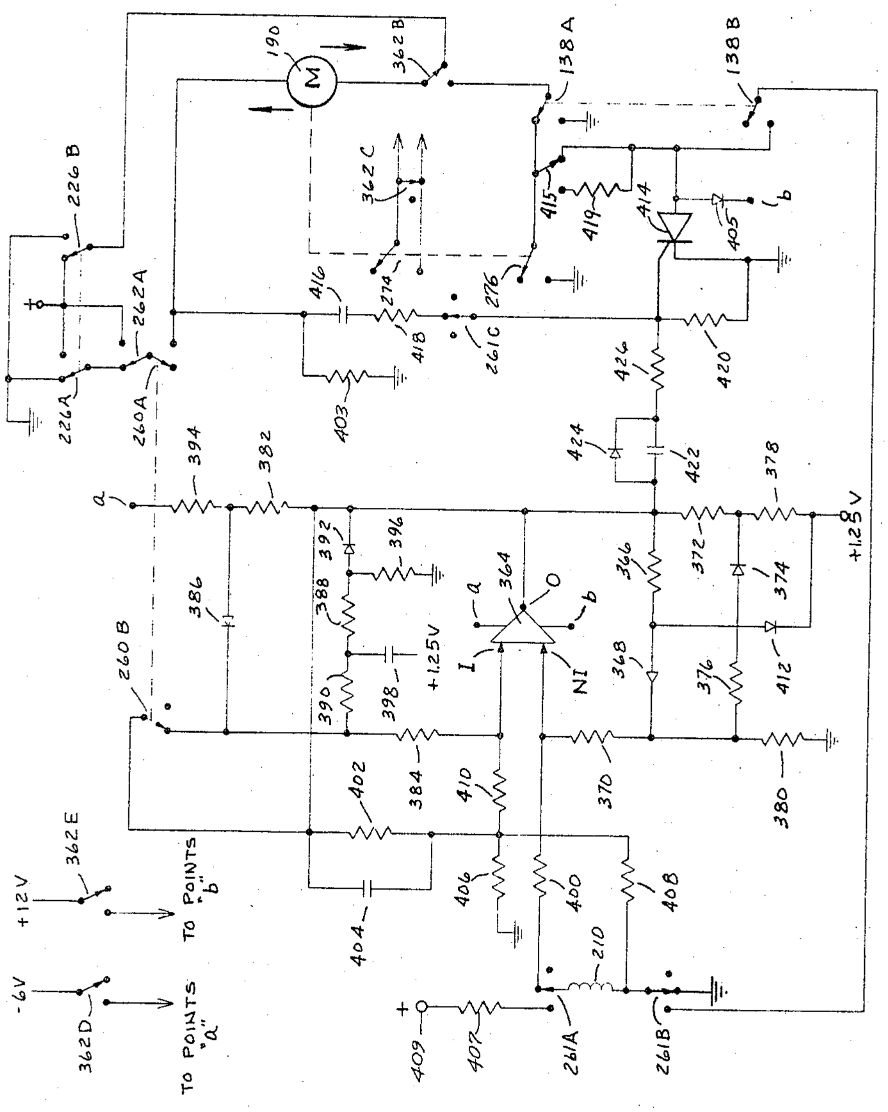
FIG. 7 is a schematic diagram of a control circuit used in the telephone station shown in FIG. 1.

Referring now to the mechanical details of the preferred embodiment of the telephone calling and receiving station 100, FIG. 2 exemplifies the manner in which ten identical keys may be arranged so that a motor may be energized for a period of time dependent upon which one of the keys is depressed. In FIG. 2, the ten keys are arranged in two groups of five, the left hand key in the upper group being shown in its depressed condition. As shown in FIGS. 2B and 2C, the bottom of button 103 is slotted to form an inclined slot in which the top of a key 120 is captured. The key 120 is normally held in a substantially vertical position between two plates 124, 126 (which form, respectively, the top and the bottom of a hollow case 130) by a spring 128 disposed around the stem of the key. The key 120 also projects through a plate 132 which is supported so that it can slide on top of the plate 124. A similar plate 134 is also slidably mounted on the top of the plate 124. Both plates 132, 134 at their rear ends overhang the hollow case 130 and are slotted as shown to receive, respectively, a leaf 135, 136 of a switch 138 and a leaf 135A, 136A of a switch 138A (FIG. 7). The switches further are mounted in any convenient manner to an end wall of the hollow case 130. The leaf 135, the leaf 136 and the fixed contacts associated therewith are connected in parallel to make up the switch 138 while the leaf 135A, the leaf 136A and the fixed contacts associated therewith are connected in parallel to make up the switch 138A. It will be evident then that switch 138 and switch 138A are both actuated when either plate 132 or plate 134 is moved forward. As will be shown later (FIGS. 3, 7) an electric motor is controlled by the switches 138, 138A.

Figure 2D:
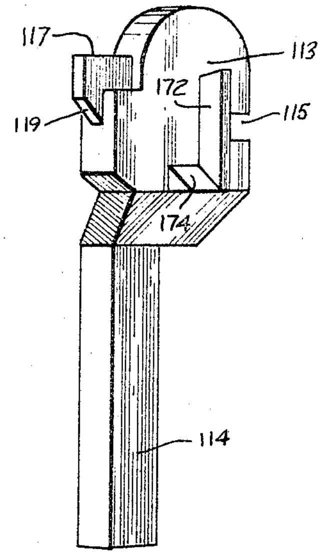
FIG. 2D depicts the details of a key employed in the keyboard.
Figure 2E:
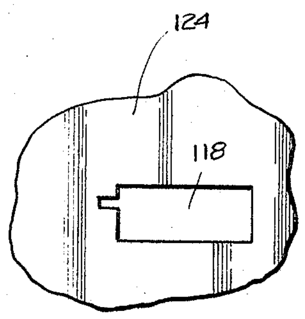
FIG. 2E illustrates the shape of the aperture in a plate through which the key head extends.

A typical key, depicted in FIG. 2D, has a head 113 which is rounded at the top and at the bottom merges into a stem 114. As shown in FIGS. 2A, 2B, and 2C, a spring 128 is disposed around the stem of the key and exerts a force upon the key tending to return the key to its elevated position in the keyboard. Extending laterally from the head of the key, as indicated in FIG. 2D is a striker plate 172 having a ramp 174 disposed on one side of the striker plate. In one edge of head 113 is a notch 115 while its opposite edge has a shoulder 116 divided by a protruding pusher plate 117 that is thinner than the remainder of the head. The head of the key protrudes through a slot in the top plate 124 of case 130. As shown in FIG. 2E, the slot 118 has a narrow aperture which receives pusher plate 117 and a wider portion which receives the thicker part of the head.

Motion of either plate 132 or plate 134 results when, as shown in FIG. 2B, a selected key 120 is forced downwardly and canted to the left by depression of one of the pushbuttons 103. The key 120 initially moves directly downwardly until the top of the shoulder 116 is below the bottom of the plate 124. In the depressed position, key 120 is free to cant to the left, so that the shoulder slips beneath the underside of plate 124. When the button 103 is released, the shoulder 116 is forced, by the spring 128, into engagement with the underside of plate 124. The key 120 is, therefore, latched in a depressed position, the plate 132 is kept to the left of its normal position, the pushbutton 103 remains depressed and the contacts of the switches 138, 138A remain actuated. The leafs 135, 135A, 136, 136A then exert a force on the plate 132 to keep that element in contact with the key 120. The plate 132, consequently, is ready to move back to its initial position under the influence of the leafs 135, 135A, 136, 136A whenever the key 120 is returned to its vertical position.

In moving downward, the sloped edge 119 of pusher plate 117 bears against lock plate 132, for example, and pushes that plate to the left, as viewed in FIG. 2B. Displacement of the lock plate by the key causes the lock plate to enter the notches 115 in the elevated keys, as indicated in FIG. 2C, and prevent those keys from inadvertently being depressed. Referring now to FIG. 2 in particular, it may be seen that five of the keys 120 project through openings in the plate 132 and that five of the keys 120 project through plate 134. When any of the former group of keys is depressed, the plate 132, is, as previously shown, moved to the left and latched in place. Plate 132 and plate 134 support, respectively, a plurality of fingers 140, 142 so that fingers 140 move when plate 132 moves and fingers 142 move when plate 134 moves. Consequently, when plate 132 is pushed to its left-hand position, fingers 140 are also moved into the notched right-hand side of each one of the keys projecting through plate 134, locking all such keys in their "up" position. Depression of any one of the keys projecting through plate 134 (instead of one of the keys projecting through plate 132) moves plate 134 and fingers 142 to effect locking of all remaining keys. Because pusher plate 117 rides downwardly in the narrow section of slot 118 (FIG. 2E) and because the lock plate is usually covering most of that narrow section when all the keys are elevated, slight downward movement of a key causes the lock plate to lock all the other keys in their elevated positions.

It is required that the contact of switches 138, 138A be actuated for a period of time depending on which of the buttons 103 is depressed. This function is accomplished by a mechanism, now to be described, which unlatches any depressed key at the end of a predetermined interval after the key is depressed. In FIG. 2, an actuator arm 144 is affixed to the left-hand one of the fingers 140 and an actuator arm 148 is affixed to a projection 146 on the plate 134. The actuator arms 144, 148 are fabricated from a resilient metallic spring material, such as beryllium copper. The free end of actuator arm 144 normally fits into a notch (not numbered) in a bell crank 150 which is pivoted on a shaft 152 and is held in position by a spring 154. The free end of actuator arm 148 normally fits into a notch (not numbered) in a bell crank 156 which is also pivoted on the shaft 152 and is held in position by a spring 158. The normal position of bell cranks 150, 156 is that in which bell crank 156 is shown. In their normal positions the depending portion of each of the bell cranks 150, 156 clears the ends of a number of rods 160 slidably mounted at equally spaced intervals along an endless belt 162. The latter, in turn, is mounted on a pair of spools 164 (only one of which is shown), one of which is driven through gears 166, 168 by a shaft 170 which is connected to the electric motor to be controlled (FIGS. 3, 7) so that when the belt moves the rods 160 are carried between the rows of keys 120. The spacing between adjacent ones of the rods 160 is substantially the same as the distance between successive keys 120 in a row. When all of the keys 120 are "up," the belt is stationary and one of the rods 160 is between the depending portions of the bell cranks 150, 156. Upon a key 120 being depressed, one or the other bell cranks 150, 156 is rotated around the shaft 152 and pushes the rod 160 which is between the depending portions of the bell cranks toward the depressed key side. The throw of actuator arm 144 or arm 148 is longer than is required to rotate the actuated one of the bell cranks 150, 156 so the end of the actuator arm rides out of the notch in its cooperating bell crank when the key 120 is depressed. Spring 154, or spring 158, then returns the rotated bell crank back to its initial position after the rod 160 has been displaced. The endless belt 162 carries the displaced rod 160, in its displaced position, toward the key which has been depressed and latched as described hereinbefore.

Each of the keys 120 has attached to it a vertical plate 172 and ramp 174 as shown in FIG. 2D. The vertical plate 172 is so dimensioned that only the displaced one of the rods 160 may contact it when the key is depressed. Consequently, after the endless belt 162 has been moved for an interval of time (determined by the distance from the point at which the depending portion of either of the bell cranks 150, 156 displaced a rod 160 to the vertical plate 172 on the depressed key 120 and the linear velocity of the endless belt 162), the end of displaced rod 160 engages vertical plate 172, forcing the depressed key 120 to the right until shoulder 116 is disengaged from the plate 124. Thereupon the key moves upwardly, causing the end of displaced rod 160 to ride up ramp 174 so that the rod is brought back in alignment with the other rods on the belt. When the depressed key 120 is unlatched, the spring 128 returns that key to its original position whereupon the plate 132 is restored to its initial position and the dialing mechanism 103 may again be operated.

Referring now to FIG. 3, it may be seen that the shaft 170 (FIG. 2) is formed to coact with a yoke 171 pivotably mounted on a shaft 171A. Shaft 150 passes through a journal 172, supports two drive gears 174, 176 and a clutch assembly 178 and the shaft's end coacts with a selector arm 180. The clutch assembly 178 comprises a clutch face 174A and a clutch face 176A integral, respectively, with the drive gears 174, 176, cooperating, respectively, with a clutch face 174B and the clutch face 176B rotatably mounted on the shaft 170. The latter faces form a thrust bearing into which a gear 181 fits to mate with gear 182 which is fixed to the clutch faces 174B and 176B. Gear 174 is mated with a gear 184 and gear 176 is mated with a gear 186. Gears 184, 186 in turn are affixed to a shaft 188 driven by an electric motor 190. The motor 190 is the motor mentioned hereinbefore in connection with FIG. 2. It may be seen, therefore, that gear 181 may be changed from "high" speed to "low" speed rotation by selective engagement of the various clutch faces in the clutch assembly 178. When the handset 101 (FIG. 1) is cradled, yoke 171 is moved (in a manner to be described) to push the shaft 170, against the force of a spring 194 captured between the journal 172 and a ring 196 affixed to the shaft 170, to the right to engage clutch face 174A with clutch face 174B. When the handset 101 is lifted from its cradle, the spring 194 causes the clutch face 176A to engage with the clutch face 176B. Thus, when the handset 101 is cradled, gear 181 is, if driven at all, driven at "high" speed and when the handset 101 is removed from its crade, gear 181 is ordinarily energized at "low" speed. If, however, the tape positioner 107 is actuated when the handset 101 is removed from its cradle, the selector arm 180 which normally rests against a notch 199 in knob 107 in a counterclockwise direction about a pivot pin 200. That movement of the selector arm 180 results in the movement of shaft 170 to the right to engage clutch face 174A with clutch face 174B so that gear 181 moves at "high" speed.

The tape positioner 107 has a cam surface engaging a crank 202 which is affixed to splined shaft 204 on which curved bar 208 is slidably mounted. A magnetic transducer 210 is mounted on the upper end of the curved bar 208 and the lower end of the curved bar 208 is captured within a U-shaped guide 212 slidably mounted on a shaft 214. The U-shaped guide 212 supports a standard 216 to which the track marker 105 is affixed. It may be seen, therefore, that the position of the magnetic transducer 210 along splined shaft 204 may be changed by the track marker 105. Whichever way the tape positioner 107 is actuated, splined shaft 204 is rotated to move the magnetic head 210 in a clockwise direction. To accomplish the unidirectional rotation of shaft 204, crank 202 is provided with a lobe 203 as shown in FIG. 3A, which is maintained in engagement with the cam surface 207 of knob 107 by spring 193 which biases the crank 202 upwardly. When knob 107 is moved in either direction, cam surface 207 causes crank 202 to rotate clockwise, as indicated by arrow 205 in FIG. 3A.

A pin 216 is affixed to tape position knob 107 to fit in a notch in a lever 218. The latter, in turn, is pivoted on a pin 220 and is formed to hold a wire 222 which is secured at one end to a plate 223. As shown in FIG. 3A, wire 222 passes through an aperture 191 in tape positioning knob 107, and at its other end the wire supports a registration pin 224 (the purpose of which is explained hereinafter). Actuation of tape positioner 107 in either direction results in a downward movement of the registration pin 224 at the free end of wire 222. A reversing switch 226 is also actuated when the tape positioner 107 is operated. A central spring leaf (unnumbered) of the reversing switch 226 is positioned underlying a cam portion 193 of the tape positioner 107. The central leaf spring is so biased that, until the tape positioner 107 is actuated, one set of contacts in the reversing switch 226 (say the lower set) are closed and the central spring leaf is slightly bowed. When the tape positioner 107 is actuated in a clockwise direction, the condition of the reversing switch 226 does not change. When, however, the tape positioner 107 is actuated in a counterclockwise direction, the condition of the contacts in the reversing switch 226 changes (FIG. 7) to reverse the polarity of current to the electric motor 190.

The weight of the handset 101 (FIG. 1) presses a rod 230 (extreme left to FIG. 3) downwardly against the force of a spring (not shown) when the handset 101 is cradled. That movement of the rod 230, in turn, causes a rod 232, pivotably attached to the rod 230 as shown, to rotate in a counterclockwise direction, causing a latch 234 to be positioned in operative position with respect to a shaft 236. That is, whenever the handset is cradled, the latch 234 forces the shaft 236 into a predetermined position. The upper end of the shaft 236 is fitted into a helical groove (unnumbered) formed in an indicator 238 rotatably mounted on a shaft 240. Thus, as shaft 236 is moved horizontally, the indicator 238 is rotated to show, at the indicating station 111A of FIG. 1, the condition of the apparatus. The shaft 236 is, as shown, affixed to a lever system consisting of a bridge member 242 and a pivoted link 244 which is attached to the mode selector 111. It may be seen, then, that manipulation of the mode selector 111 results in a changed indication at the indicating station 111A of FIG. 1.

A pair of pins 246 depend from the bridge member 242 and straddle a cam 248 affixed to a shaft 250 so that the shaft is rotated in accordance with the movement of bridge member 242. An actuator bar 252, fitted through a slot in a permanent magnet 254 which is slidably mounted on the curved bar 208, is affixed to the shaft 250. Thus the position of one end of the permanent magnet 254 with respect to the magnetic transducer 210 is changed as the mode selector 111 is manipulated. When the magnet 254 is elevated, it materially affects the magnetization of the tape passing above it, whereas when the magnet is in its lowered position it is sufficiently spaced from the tape so as not to affect signals recorded on the tape. The shaft 250 also supports a crank 256 having a crank arm 257 fitted in a triangular opening (unnumbered) in switch actuator 258. The latter element, in turn, is affixed to the operate button 109 and is pivotably mounted on the pivot shaft 259 of the tape position adjuster 107 so that it rests on the top of the wire 222. Thus, whenever the operate button 109 is depressed, either manually or when the crank arm 256 is rotated in response to manipulation of the mode selector 111, the wire 222 is depressed carrying the registration pin 224 downwardly and actuating an operate switch 260. As long as the registration pin 224 remains depressed, the operate switch 260 remains actuated.

Switches 261, 261A, 261B are disposed underlying the cam 248, the central leaf of each one of such pair of switches being moved by the cam 248 when the mode selector 111 is manipulated. As will be seen clearly in FIG. 7, the switches 261, 261A, 261B change the connection to the magnetic transducer 210 when the mode of operation of the station is changed.

Referring now to FIGS. 2 and 3, it may be seen that the electric motor 190, when energized, also drives a multiple-lobe cam 270 (FIG. 3) and a multiple-lobe cam 272 (FIG. 2) which actuate, respectively, a pulse switch 274 (FIG. 3) and a pulse switch 276 (FIG. 2). As will become clear hereinafter, it is first necessary that pulse switch 276 (FIG. 2) operate once before pulse switch 274 (FIG. 3) operates but thereafter the two switches must operate in synchronism with a fixed time lag between operations. The latter requirement is relatively easy to meet, since it is evident that the number and position of the lobes on the multiple-lobe cams 270, 272 may be varied to accomplish the desired synchronization. To meet the former requirement, it is necessary that the multiple-lobe cam 270 "skip" one pulse when the electric motor 190 is energized.

Figures 4, 4B:
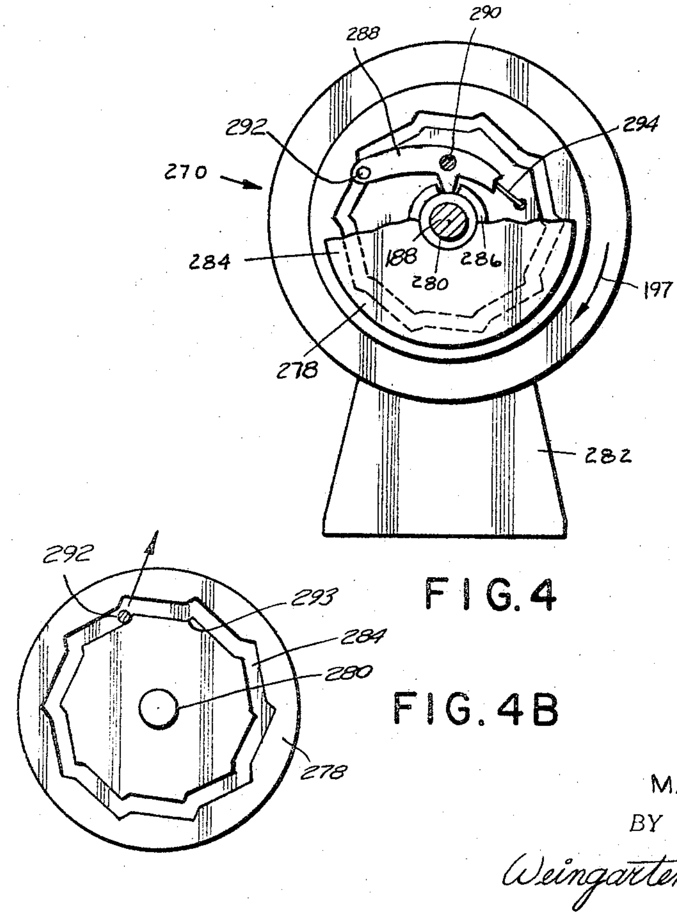
FIG. 4 is a view, partially broken away, of a skip pulse clutch mechanism.
FIG. 4B is a plan view of the track in the cam in which the pin of the clutch rides.
Figure 4A:
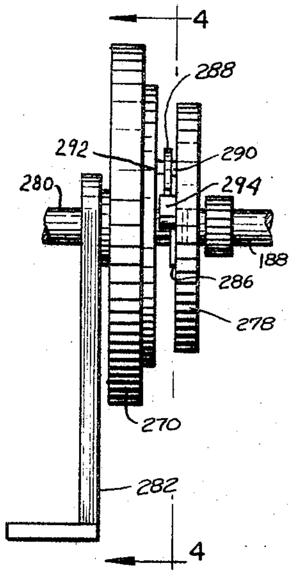
FIG. 4A is an elevational side view of the skip pulse clutch.

Referring now to FIGS. 4, 4A and 4B, a clutch which operates to "skip" one pulse by delaying rotation of the multiple-lobe cam 270 (FIG. 3) for a fixed period of time after the electric motor 190 is energized is shown. An end plate 278 is affixed to the shaft 188 to pivotably support the coupling unit (presently to be described) which operates to connect the multiple-lobe cam 270 to the end plate 278 only after the end plate has been rotated through a predetermined angular distance. The multiple-lobe cam 270 is mounted on a bearing 280 affixed to a mount 282 so that one surface of such cam is parallel to, and spaced from one surface of the end plate 278. A channel 284 is formed, as shown in FIG. 4B, in such facing surface of the multiple-lobe cam 270. A split ring 286 is mounted on the bearing 280 adjacent to the side of the multiple-lobe cam 270 which faces the end plate 278. The coupling unit comprises a bell crank 288 pivotably mounted on a pin 290 projecting outwardly from the end plate 278, a pin 292 affixed to the bell crank 288 and projecting into the channel 284, and a biasing spring 294, affixed to the end plate 278 in any convenient manner and fitted into a slot in the bell crank 288, is bowed to normally bias the bell crank 288 to force the pin against the inside edge of channel 284. A finger 195 formed integrally with the bell crank 288 fits into the opening in split ring 286. When end plate 278 starts to rotate in the direction of the arrow 197 in FIG. 4, the static friction existing between split ring 286 and bearing 280 produces a torque on bell crank 288, causing that element to be rotated about pin 290 in a clockwise direction against the biasing force of spring 294, whereupon the spring snaps over so that it is bowed in the opposite direction. Such rotation of the bell crank 288 moves pin 292 from behind the shoulder 291 in channel 284 (FIG. 4B) so that end plate 278 and the coupling unit may rotate without moving the multi-lobe cam 270. Because spring 294 has snapped over, pin 292 now bears against the outside edge of channel 284 as it is carried through the channel. Finger 195 on bell crank 288 remains in the opening in split ring 286, causing the split ring 286 to rotate, whereupon the friction between split ring 286 and bearing 280 drops to a low value. Channel 284 is, as it were, "inclined," as in FIGS. 4 and 4B, to constrain bell crank 288 to rotate clockwise about pin 290 and cause spring 294 to snap back and hold pin 192 against the inside edge of channel 284. Consequently, when the pin 292 comes into contact with the next shoulder 293 in the channel 284 the split ring 286 is rotating at substantially the same speed as the bell crank 288. Thus, there is little, if any, torque developed to cause the pin 292 to rotate from behind the second shoulder 293, and the multi-lobe cam 270 is coupled to (and rotates at the same speed as) the end plate 278.

It should be noted here that the illustrated clutch operates on the principle that the static friction and the sliding friction between two bodies is different. Such a principle, however, need not be used to accomplish the desired end. For example, a magnetic clutch energized in response to the first closure of the switch 276 could replace the illustrated mechanism.

Referring now to FIG. 5, the constructional details of the magnetic tape magazine 104 may be seen. This sub-assembly may be snapped into place in an appropriately shaped opening in the base and cover assembly 102, as shown in FIG. 1, or removed as a unit as shown in FIG. 5. Thus, base 300 supports a cover 302 and a window 304 as shown. The base 300 is molded with a transverse opening, a portion of which is indicated by the numeral 305 overlying the transverse opening in the view shown in FIG. 5. A latch 306 is slidably supported on the side walls of the base 300. When the latch 306 is in the position shown, a frame 308 hinged to the cover may be opened, without opening the cover 302, to expose a prepared surface of a magnetic tape 312. The exposed tape surface is prepared as by painting with a white paint, so that names or other information may be written on it. When the latch 306 is moved to the right, a catch 314 integral with the latch 306 engages a slot 314A in the frame 308, thus making it extremely inconvenient to mark the prepared surface of the magnetic tape 312. Latch 306 has an attached flat plate 306A which is positioned over the transverse opening 305 in the base 300 when the latch is toward the left (as shown) so that the flat plate serves as a platen supporting the magnetic tape 312 when written entries are to be made on the tape. One end of cover 302 is attached by hinges, as hinge 316, to the base 300 while the other end of the cover 302 is formed as shown to snap into complementary indentations, as that indicated by the numeral 318, in the base 300. It is evident, then, that the window 304 may be opened independently (without lifting the cover 302) whether or not the tape magazine 104 is in operative position in the base and cover assembly 102. A number of guide lines 320 are disposed as shown on the cover 320, each of such lines being formed in any convenient manner so that the exact position of the track marker 105 (FIG. 1), and the magnetic transducer 210 (FIG. 3), relative to information recorded on the magnetic tape magazine 104 can be easily determined when the cartridge is in operative position.

The base 300 is formed to accommodate a take up roll 322, a take up roll 324 and a tape drive roll 326. The latter is mounted on a shaft 328 which also supports a gear 330 and a pair of sprocket wheels 332. The gear 330 in turn, mates with the gear 181 (FIG. 3) and the sprocket wheels 332 mate with sprocket holes (unnumbered) formed in the magnetic tape 312. A slot is provided in base 300 which permits gear 181 to extend into the base and engage gear 181. Proper mating of the gear 330 with the gear 181 is assured by mounting the shaft 328 in opposing bearings 334 which are pressed in place in the base 300 and project a short distance therefrom. Each of the bearings 334 fits into an appropriately shaped slot (not shown) in the base and cover assembly 102 (FIG. 9), so that as the magnetic tape magazine 104 is being placed in position, it may be rotated only about the longitudinal axis of the shaft 328, thereby ensuring correct alignment of the teeth of the gears 181, 130. It should be noted here that the bottom of the base 300 is formed to have a projection 336 approximately midway between the sides of the base 300 near the end of the base 300 removed from the bearings 334. It may be seen, therefore, that the magnetic tape magazine 104 is, when finally seated in the base and cover assembly 102, uniquely positioned with respect thereto since the bearings 334 and the knob 336 provide a "three-point" bearing for the magnetic tape magazine 104.

Two transverse ribs 338 are formed integrally with the window 304 so as to bear, when the window 304 is closed, on the top surface of the magnetic tape 312. The two transverse ribs 338 are so positioned that each overlies the transverse opening 305 in the base 300. Thus, when the cover 302 and the window 304 are closed, the magnetic tape 312 is slightly depressed in the transverse opening 305. The magnetic transducer 210 (FIG. 3) in turn bears against the lower surface of the magnetic tape 312 between the lines of contact of the transverse ribs 338 thereon so that an intimate contact is established between he magnetic transducer 210 and the magnetic tape 312. It is noted here that it is not essential that the transverse ribs 338 be solid as shown since a number of spaced dimples would be equally well adapted to hold the magnetic tape.

Referring now to FIG. 6, the details of the takeup roll 332 (FIG. 5) may be seen. This sub-assembly comprises a shaft 340 mounted in opposing bearings 342, 344 pressed into the bottom 300, a roller 346 rotatably mounted between the bearings 342, 344, a spring 348 ultimately connecting the shaft 340 and the roller 346, and a brake assembly 350. The spring 348 is wound around a sleeve 352 loosely mounted on the shaft 340, one end of the spring 348 being affixed to the bearing 342 and the other end being attached to a ring 354. Tabs, such as shown at 356 are affixed to the ring 354, to project through slots (unnumbered) in the roller 346. It may be seen, therefore, that the spring 348 may exert a force, through the ring 354 and the tabs 356, on the roller 346 to cause the latter element to rotate until no tension remains in the spring 348. In the illustrated takeup roll 322 the spring 348 is prestressed to cause the roller 346 always to rotate in a clockwise direction if any rotation is possible.

The ring 354 is affixed to the shaft 340, with a spring 358 disposed between the sleeve 352 and the ring 354. The ring 354 and the shaft 340 are, therefore, normally urged to the right in the figure until the free face of the ring 354 contacts an O-ring 360 mounted fixedly in the bearing 344. In that position, the end of shaft 340 (not visible in FIG. 6) protrudes from bearing 344. Thus, when there is not restraining force applied to the shaft 340 (as when the magnetic tape cartridge 104 is not in place in the base and cover assembly 102), spring 358 is operative to move the ring 354 into contact with the O-ring 360 to establish a braking force to counteract the force of the spring 348. When the magnetic tape magazine 104 is placed in the base and cover assembly 102, the end of the shaft 340 projecting through the bearing 344 is trapped in an inclined slot (not shown) to force the shaft 340 into the position illustrated in FIG. 6. Thus, the braking force is automatically removed when the tape magazine 104 is positioned for operation. The takeup roll 324 (FIG. 5) may be identical with the takeup roll 322, just described, with the exception that the spring in the takeup roll 324 is wound oppositely to that in the takeup roll 322. That is, the spring in the takeup roll 324 rotates therein in a counterclockwise direction. In passing, it will be noted that no brake assembly, as brake assembly 350, is required in takeup roll 324.

It will now be clear that, when the magnetic tape magazine 104 is in position in the base and cover assembly 102, the magnetic tape 312 is pulled to the right by the action of takeup spool 322 and to the left by the action of takeup spool 324. The resulting tension (equal to the sum of the forces exterted by the spring 348 and the corresponding spring in the takeup spool 324) on the magnetic tape 312 keeps that rather flexible element flat, regardless of how much of the tape is on either of the takeup rolls 322, 324. Further, if the springs have substantially constant spring constants, the tension on the tape remains substantially constant regardless of the relative amount of tape on either takeup roll. In addition, since the force required to move the magnetic tape 312 from one takeup roll to the other is equal to the difference between the force exerted by springs 348 and the corresponding spring in the takeup roll 324, the force required to be exerted by the sprocket wheels 332 to move the magnetic tape 312 would, theoretically, be zero. Conversely, in the absence of a brake assembly, such as the brake assembly 350, the magnetic tape 312 would move, when the magnetic tape magazine 104 is taken out of its receptacle in the base and cover assembly 102, to a position where the forces acting on it are equal.

Referring now to FIG. 7, it should first be noted that the numbering of previously described elements has not been changed, except to distinguish between sections of the various switches. For example, the operate switch 260 (FIG. 3), which has two sections, has been shown here as a switch 260A and a switch 260B joined by a broken line to indicate that the two are ganged to operate together. It should also be noted that each one of the various switches is here shown in its "normal" position, i.e. the position taken when the handset 101 (FIG. 1) is cardled and the tape positioner 107 and the operate switch 260 are each in the position shown in FIG. 3. Still further, it should be noted that the hook switch previously referred to comprises switches 362A, 362B, 362C, 362D, and 362E.

The operate switch 260A must be moved to its off-normal position before the electric motor 190 may be energized. As previously pointed out, such movement results when the tape selector 109 (FIGS. 1 and 3) is actuated. Thus, with the circuit in the condition illustrated, actuation of the tape selector 109 results in movement of the operate switch 260A to its off-normal position to complete, through switches 226B, 362B, the electric motor 190, switches 260A, 362A and 226A, a circuit from a 12 volt source (not shown) to ground. If the tape selector 109 is actuated to move switches 226A and 226B to their off-normal positions, the circuit is completed but the direction of current flow is reversed.

The switches 226A, 226B, however, always are returned to their normal positions when the tape selector 107 is released so that, regardless of the direction in which that element was actuated, the direction of the current flow through the electric motor 190 is ultimately in a predetermined direction, say upwardly, as shown in FIG. 7, until the registration pin 224 (FIG. 3) mates with the first met registration hole in the magnetic tape 312. It should be noted here in passing that, as long as the handset 101 is cradled, the clutch 178 (FIG. 3) is in its "high-speed" condition causing the gear train (which converts the rotary motion of the electric motor 190 to linear motion of the magnetic tape 312) to act as a relatively efficient brake at the instant the electric motor 190 is de-energized. This feature, obviously, permits rapid scanning to locate the "frame" on the magnetic tape 312 on which any desired name or number appears and, at the same time, obviates the danger of ripping the magnetic tape 312 by driving the registration pin 224 past a registration hole. Further, it should be noted that, even though the pulse switch 274 may be actuated, hook switch 362C prevents the pulses from the pulse switch 274 from affecting the telephone lines.

When the handset 101 is removed from its cradle, hook switches 362A, 362B, 362C and 362D and 362E are moved to their off-normal positions. The station may then be conditioned, as desired, to reproduce a recorded telephone number, to be used as a conventional dialing station, or to record a telephone number and, simultaneously, to actuate a telephone system. With the foregoing in mind, the details of the illustrated circuit will now be described, considering its different modes of operation in the order just set out.

Movement of hook switches 362D, 362E to their off-normal positions causes biasing voltages of say +12 v. and −6 v. to be applied to a latching amplifier 364, which may be a type 702 μa operational amplifier manufactured by Fairchild Semiconductor, a division of Fairchild Camera and Instrument Corp., Mountain View, California. The latching amplifier 364 has two signal input terminals, labelled I and NI which indicate, respectively, an "inverting" and a "non-inverting" input, and a single output terminal, labelled O. A positive feedback path (resistors 366, 370 and diode 368) and a negative feedback path (resistors 372, 376, 370 and diode 374) are arranged between the output terminal O and the NI terminal, both feedback paths being coupled through resistors 387, 380 to, respectively, a voltage source of +1.25 v. (not shown) and to ground. A positive feedback path (resistors 382, 384, and diode 386) and a negative feedback path (resistors 388, 390, 384, and diode 392) are arranged between the output terminal O and the I terminal, both feedback paths being connected to a voltage source of −6 v. (not shown) through a resistor 394. The anode of diode 392 is grounded through a resistor 396 and the junction of resistors 388, 392 is connected, through a capacitor 398, to the +1.25 volt source. The NI terminal is also connected, through a resistor 400 and the switch 261A, to the high side of the magnetic transducer 210 and thence, through the switch 261B to ground. The I terminal is also connected to ground through parallel paths (resistor 384, operate switch 260B, a resistor 402 and capacitor 404, and resistors 406, 408, 410). Finally, the junction of the diode 368 and the resistor 366 is connected through a diode 412 to the +1.25 volt source.

In effect, then, the I terminal of the latching amplifier 364 is grounded before the operate button 109 (FIG. 3) is depressed and the feedback paths between the O terminal then is determined by the voltage applied to the NI terminal from the magnetic transducer 210. In the absence of any relative movement between the magnetic transducer 210 and the magnetic tape 312, the voltage at the O terminal stabilizes at approximately zero volts, with respect to ground.

When the operate button 109 is depressed switches 260A and 260B are moved to their off-normal positions. Movement of switch 260A (the handset 101 being removed from its cradle) results in application of +12 volts, through the electric motor 190, to the anode of a silicon controlled rectifier (designated as SCR 414) and application of a positive pulse, through capacitor 416, switch 261 and resistors 418, 420, to the control electrode of such rectifier. Simultaneous application of voltages to the anode and the control electrode of the SCR 414 (which may be a type SW6015 manufactured by Transitron Co., Wakefield, Massachusetts) fires that element to reduce its impedance substantially to zero. Thus, the circuit through the electric motor 190 is complete through the SCR 414 and the electric motor 190 starts to rotate. Pulse switch 276 is (as described hereinbefore) actuated after the electric motor 190 is energized. That is, pulse switch 276 is, after a predetermined movement (say 36°), of the electric motor 190, closed to remove the +12 volt potential from the anode of the SCR 414. Since the pulse on the control electrode of the SCR 414 is of very short duration, when the pulse switch 276 reopens to apply the +12 volt potential to the anode of the SCR 414, no voltage is then applied to the control electrode thereof. Consequently, the circuit of the electric motor 190 is broken, thus causing it to stop.

It will be noted that relative motion between the magnetic transducer 210 and the magnetic tape 312 at "low speed" is effected (FIG. 3) whenever the electric motor 190 is energized and, further, that switch 260B is opened by actuation of the operate button 109. Thus, the feedback path from the O terminal to the I terminal of the latching amplifier 364 is enabled and, if the magnetic transducer 210 encounters a signal on magnetic tape 312, a positive pulse is applied to the NI terminal of the latching amplifier 364 to raise the voltage at the O terminal of the latching amplifier 364. The positive feedback paths to the I and NI terminals then being operative, cause the voltage at the O terminal to step to some positive voltage, say 5 volts, with respect to ground and to remain at such voltage after the input pulse passes. The step voltage at the O terminal is coupled through a diode 424 and a resistor 426 to the control electrode of SCR 414. Consequently, the latter element is fired each time pulse switch 276 returns to its normal position so that the electric motor 190 continues to turn even though the pulse switch 276 is periodically opened and closed.

When the magnetic transducer 210 passes a reversal in magnetization of the magnetic tape 312 (indicating the end of a recorded digit) a negative pulse is applied to the NI terminal of the latching amplifier 264 and the negative feedback path, comprising resistors 370, 372, 376 and diode 374, is immediately effective to step the voltage at the O terminal to a negative voltage, say −5 volts. As the diode 424 is reversely biased by the negative voltage, only the leading edge of this voltage is fed through capacitor 422 to the control electrode of SCR 414, with the result that the circuit to the electric motor 190 is broken the first time that the pulse switch 276 opens after generation of a negative step at the O terminal of the latching amplifier 364.

It will be observed that the negative feedback path from the O terminal to the I terminal of the latching amplifier 364 incorporates a time delay. Thus, when the cathode of diode 392 is driven negative, the step voltage applied to the capacitor 398 has no immediate effect, since the voltage across that element cannot change instantaneously. After a period of time has elapsed, here approximately 600 milliseconds, the voltage across the capacitor 398, however, changes sufficiently to make the voltage on the I terminal equal to the voltage on the NI terminal with the result that the output of the latching amplifier 364 starts to go positive, thus making the positive feedback paths effective. As soon as the two positive feedback circuits become effective, the output of the latching amplifier 384 steps back to its original value. The leading edge of the just-mentioned step is coupled through capacitor 422 to the control electrode of the SCR 414. Since the operate switch 260A is in its off-normal position (the registration pin 226 being still removed from a registration hole in the magnetic tape) the SCR 414 is fired as described hereinbefore and the electric motor 190 is again energized to move the magnetic tape 312 relative to the magnetic transducer 210. Consequently, if the magnetic transducer 210 passes the beginning of another recorded digit before the pulse switch 276 goes through one complete "close-open" cycle, the electric motor 190 continues to be energized as just described. Otherwise, the electric motor 190 is energized for only a short period (say 40 milliseconds) and the circuit is then disabled until it is conditioned for another operation by returning the hook switches 362A, 362B, 362C, 362D and 362E to their normal positions, thereby reversing the current through the electric motor 190 until the registration hole in the magnetic tape 312 mates with the registration pin 226.

It should be noted in passing that a connection (unnumbered is made from the bottom of the resistor 382 to the top of resistor 402. This connection, while not essential to the invention, ensures negative feedback to stabilize the gain of latching amplifier 364. It should also be noted that a resistor 403 is connected from the top of the capacitor 416 to ground. This resistor limits the amplitude of the pulse to the control electrode of the SCR 414 when the operate switch 260A is moved to its off-normal position and then provides a discharge path of the capacitor 416 when the operate switch 260A returns to its normal position. Further, it should be noted that a diode 405 is connected between the anode of SCR 414 and the +12 volt supply. This connection limits the amplitude of any transient voltage which may be applied to the SCR 414 through the electric motor 190.

When it is desired to use the illustrated station as a conventional telephone dialing station, mode selector 111 is manipulated to move the switches 261, 261A, 261B to their right-hand positions, in FIG. 7 after the handset 101 has been removed from its cradle. Movement of the mode selector 111, as noted hereinbefore with respect to FIG. 3, moves the operate switch 260A to its off-normal condition, while removal of the handset 101 from its cradle causes switch 362A, 362B, 362C, 362E to move to their off-normal positions. The electric motor 190 is not energized, as described hereinbefore, for a period of time sufficient for the pulse switch 276 to go through one "close-open" cycle since switch 261 is in its right-hand position. When any push button 103 is depressed, switches 138A and 138B are moved to their off-normal positions and remain in such positions for a period dependent, as described in connection with FIG. 2, on which one of the push buttons 103 was depressed. The electric motor 190 is, therefore, energized from the positive supply through switches 362A, 360A and 138A, causing switch 274 to be operated as described above in connection with FIG. 4. Even through the amplifier 364 is biased to be operative, the magnetic head 210 is disconnected by movement of switches 261A and 261B and no signal is passed to the control electrode of SCR 414 because switch 261C is opened. Consequently, SCR 414 does not fire. When switch 138A returns to its normal position, switch 276 may be either in its normal or off-normal position. If switch 276 is in the former position, the circuit of the electric motor 190 is opened and that element stops immediately. If the switch 276 is in its off-normal position when switch 138A returns to its normal position, then the circuit of the electric motor 190 remains completed until switch 176 is returned to its normal position. It follows, then, that operation of switch 274 and switch 276 should be so phased with respect to each other that switch 274 finally is moved to its off-normal position before switch 276 is so moved (to obviate any chance of an extra actuation of switch 274).

When it is desired to dial a number and at the same time record such number on the magnetic tape 312, handset 101 is removed from its cradle, thus causing hook switches 362A, 362B, 362C and 362D, 362E to move to their off-normal positions. Such movement connects the electric motor 190 in circuit with switch 138A and makes the pulse switch 274 ready to pulse the telephone line 113. Such movement also enables the amplifier 364 but, as will presently be shown, also drives that element to a neutral state. The mode selector 111 is then actuated to connect the magnetic transducer 210 across the left hand contacts of switches 261A and 261B. Such movement also moves switches 260A and 260B to their off-normal positions and a positive voltage is applied through resistor 407 to the inverting input, labelled I, of the amplifier 364. Again, as will become clear hereinafter, the amplifier 364 is thereby driven to its negative state without further effect at this time. It will be observed that when the switch 260A is moved into its off-normal state, a positive pulse is passed through capacitor 416 but switch 261C, being in its left-hand position, prevents such pulse from passing to the SCR 414.

When a number is to be dialed, the push button 103 (FIG. 2) indicating the first digit of the desired number is depressed, thus moving switches 138A and 138B to their off-normal positions for a period of time determined as described hereinbefore. The circuit to energize electric motor 190 is then completed to ground through the switch 138A and a circuit is completed from a DC source at terminal 409 through a resistor 407, the magnetic transducer 210, switch 138B and through SCR 414 to ground. The last named element is "fired" (when switch 138B closes) since a positive potential is then applied to the anode through the amplifier 364 previously described. As long as switches 138A, 138B remain in their off-normal conditions, the electric motor 190 is energized and current flows through the magnetic transducer 210 to effect recording of a "block" on the magnetic tape 312. The pulse switch 276 is actuated without effect during this period, but pulse switch 274 is actuated, as previously described, to produce dial pulses on the telephone line 113. When the switch 138B returns to its normal position, the circuit through the magnetic transducer 210 is broken and the voltage on the control electrode of the SCR 414 is reduced to ground potential. The potential on the anode of the SCR 414, however, remains at a relatively high level (through switch 138A) until the pulsing switch 276 is moved to its normal position. The erase magnet 254 is, as noted hereinbefore, in its elevated position when recording is to be effected. This element simply "wipes the magnetic tape 312 clean" immediately before the gap in the magnetic transducer 210. That is, the erase magnet 254 reverses the direction of magnetization of the magnetic tape 312 from the direction of magnetization to be imparted to the magnetic tape 312 by the magnetic transducer 210. It follows then, if the magnetic tape 312 is originally magnetized in such a direction, a recording current thorugh the magnetic transducer 210, while it is being moved relative to the magnetic tape 312, results in changing the direction of magnetization of a section of the magnetic tape 312. Further, since the electric motor 190 is always energized for a fixed period of time, say 40 milliseconds, in excess of the period of time during which the recording current flows through the magnetic transducer 210, the end of each such section is always clearly recorded. Each subsequent digit of the desired number is recorded, in order, in the same manner as just described, until the complete number is recorded. It is noted here that, in contrast with known automatic dialers, there is no requirement here that the electric motor 190 be driven for a period of time equal to the desired interdigital space nor is there any requirement that an "end of number" space be generated.

In recording telephone numbers, the information placed on the magnetic tape is in the form of pulses. The magnetic tape may also be used to record audio signals which can be transmitted when the connection with the called telephone station is made. In recording and reading the audio signals, it is desirable to use a higher speed than when recording or reading the pulse signals. A switch 415 is provided in the circuit of FIG. 7, the switch having two positions marked P and A. When switch 415 is in the P position, a resistor 419 is inserted in the motor circuit and causes the motor 190 to turn at a speed which transports the magnetic tape at the speed appropriate for recording or reading of pulse signals. When switch 415 is in the A position, resistor 419 is effectively shunted out of the circuit and the motor 190, consequently, rotates at a higher speed which causes the magnetic tape to be transported at the speed appropriate for recording or reading audio signals. When calling another telephone station, switch 415 is initially placed in the P position so that the pulse information can be read from the magnetic tape at the proper speed. Upon connection being made with the called telephone station, switch 415 is placed in the A position so that audio signals may be either read from or recorded on the magnetic tape at a higher speed than is used for the pulse signals.

While the described embodiments constitute practical assemblies for attaining the purposes of the invention, it should not be assumed that such embodiments are the only structures possible. Thus, for example, the dialing unit shown in FIG. 2 may be modified greatly, without departing from the concepts of this invention, by having all the push butons in a single straight row or around the periphery of a circle.

Further, it is not essential that the particular amplifier shown in FIG. 7 be used, since any control circuit adapted to "latching" may be subsituted for such amplifier. It is felt, therefore, that this invention should not be restricted to its described embodiments, but rather should be limited only by the spirit and scope of the appended claims.

What is claimed is:

1. Telephone station apparatus for voice and data communications and incorporating a magnetic recorder for recording and reproducing data to be transmitted, such recorder including a record medium of tape-like form and having a plurality of registration indicia disposed longitudinally thereof to divide the record medium into discrete data recording portions and a transducer to record and to reproduce data in selected ones of such data recording portions, comprising:

means for disabling the transducer and longitudinally positioning, at a first speed, the record medium relative to the transducer until any selected one of the plurality of registration indicia is in registration with the transducer;

said means including an electric motor mechanically coupled to the record medium;

a reversing switch in circuit with the electric motor and a source of electric power, such switch being disposed, normally, to enable rotation of the electric motor in a fixed direction;

a control switch connected between the electric motor and the reversing switch, such switch normally being closed only when no single one of the registration indicia is in registration with the transducer;

manually actuable means for closing the control switch when any one of the registration indicia is in registration with the transducer selectively positioning the reversing switch in either one of its positions, and moving the transducer out of its operative position with respect to the record medium, thereby to energize the electric motor to longitudinally position the record medium until the last named means is deactuated and the control switch is open;

a matrix of keys, each key thereof being manually actuable;

means, responsive to actuation of any key, for simultaneously energizing the transducer and moving at a second speed, the record medium longitudinally of itself past the transducer; and means, responsive at a time dependent upon the particular key actuated, for first de-energizing the transducer and then stopping the movement of the record medium.

2. Telephone station apparatus as in claim 1 having, in addition:

(a) means for connecting a source of audio signals to the transducer; and, (b) means for moving the record medium at said second speed when the source of audio signals is connected to the transducer.

3. Telephone station apparatus as in claim 1 and further including a telephone handset, and means for selectively providing a manual mode of operation and an automatic mode of operation.

4. Telephone station apparatus as in claim 1 wherein said record medium is disposed within a cartridge removably contained in said apparatus.

5. Telephone station apparatus as in claim 1 wherein the means, responsive to the actuation of any key, for energizing the transducer and moving the record medium includes:

(a) the electric motor geared to the record medium;

(b) means for locking the control switch in its closed position;

(c) an electronic switch in circuit with the electric motor to complete, when actuated, an energizing circuit to such motor; and, (d) a first and second switch means actuated when any one of the keys is actuated, the first switch means being in circuit with the transducer and the second switch means being in circuit with the electronic switch, respectively to energize the transducer and to actuate the electronic switch when any one of the keys is actuated.

6. Telephone station apparatus as in claim 5 wherein the means for first deenergizing the transducer and then stopping the movement of the record medium, includes:

(a) means for opening at a time dependent on the particular key actuated, the first and the second switch means, to de-energize the transducer and to prepare the electronic switch for deactuation;

(b) a first multi-lobe rotary switch disposed across the electronic switch; and (c) means for driving the first multi-lobe rotary switch when the electric motor is energized to maintain, after the electric switch is deactuated, the energizing circuit to the electronic motor until the first multi-lobe rotary switch opens for the first time after the second switch means opens.

7. Telephone station apparatus as in claim 6 having, in addition:

(a) a second multi-lobe rotary switch normally driven to close when the first multi-lobe rotary switch is opened;

(b) clutch means disposed between the second multi-lobe rotary switch and the electric motor;

(c) means for actuating the clutch means only after the first multi-lobe rotary switch closes for the first time; and, (d) means connecting the second multi-lobe rotary switch in circuit with a telephone line finally to produce thereon a signal train indicative of the particular key actuated.

8. Telephone station apparatus as in claim 7 having, in addition:

(a) selection means, including a mode selection switch for enabling the magnetic recorder to reproduce any data recorded in the record medium;

(b) manually actuated switch means momentarily to close the control switch and to energize the electronic switch when the mode selection switch is in position to enable the magnetic recorder to reproduce any data recorded in the record medium thereby to start the electric motor.

9. Telephone station apparatus as in claim 8 having, in addition:

(a) control motor means, responsive during the time data recorded is being reproduced, for maintaining actuation of the electronic switch thereby to maintain energization of the electric motor and to actuate the second multi-lobe rotary switch through the clutch means; and, (b) means responsive at the end of the time during which data is being reproduced, to inhibit the motor control means for a fixed period of time and then to energize the electric switch thereby finally to move the record medium relative to the transducer to determine the presence of a following bit of data recording in the record medium.

References Cited

UNITED STATES PATENTS

| | | | |
|---|---|---|---|
| 3,317,678 | 5/1967 | Logan et al. | |
| 2,921,142 | 1/1960 | Tinus | 179—90 |
| 3,229,042 | 1/1966 | Kilburg | 179—90 |
| 3,301,958 | 1/1967 | Blakeslee | 179—90 |
| 3,364,314 | 1/1968 | Huizinga | 179—90 |

WILLIAM C. COOPER, *Primary Examiner.*

ALBIN H. GESS, *Assistant Examiner.*